United States Patent [19]

Moody

[11] 4,308,480
[45] Dec. 29, 1981

[54] AUTOMATIC BRUSH SHIFTING FOR A D.C. SERIES MOTOR

[76] Inventor: Warren E. Moody, 95 Fiesta Way, Fort Lauderdale, Fla. 33301

[21] Appl. No.: 119,239

[22] Filed: Feb. 7, 1980

[51] Int. Cl.³ ............................................. H02K 13/00
[52] U.S. Cl. .................................... 310/242; 310/229; 310/230; 310/244
[58] Field of Search ............... 310/229, 230, 231, 148, 310/220, 221, 222, 239, 238, 240, 241, 242, 245, 246, 247

[56] References Cited

U.S. PATENT DOCUMENTS

| | | | |
|---|---|---|---|
| 831,446 | 9/1906 | Latour | 310/240 |
| 1,164,260 | 12/1915 | Creveling | 310/230 |
| 1,855,281 | 4/1932 | Chilton | 310/240 |
| 2,128,598 | 8/1938 | Williamson | 310/240 |
| 2,414,523 | 1/1947 | Harding | 310/230 UX |

FOREIGN PATENT DOCUMENTS 944073  6/1956  Fed. Rep. of Germany ...... 310/240

Primary Examiner—R. Skudy
Attorney, Agent, or Firm—Edwin E. Greigg

[57] ABSTRACT

Electromagnetic or solenoid means responsive to load current to automatically shift the brushes of a motor or generator a proper amount so as to maintain satisfactory commutation from light to full load, the brush shifting means including electric solenoid means carrying machine load current, movable brush holding means mounted on antifriction bearings, and mechanically connecting the electric solenoid means mounted on a machine frame means to brush holder means so as to shift brushes in conformity to changing load conditions.

4 Claims, 3 Drawing Figures

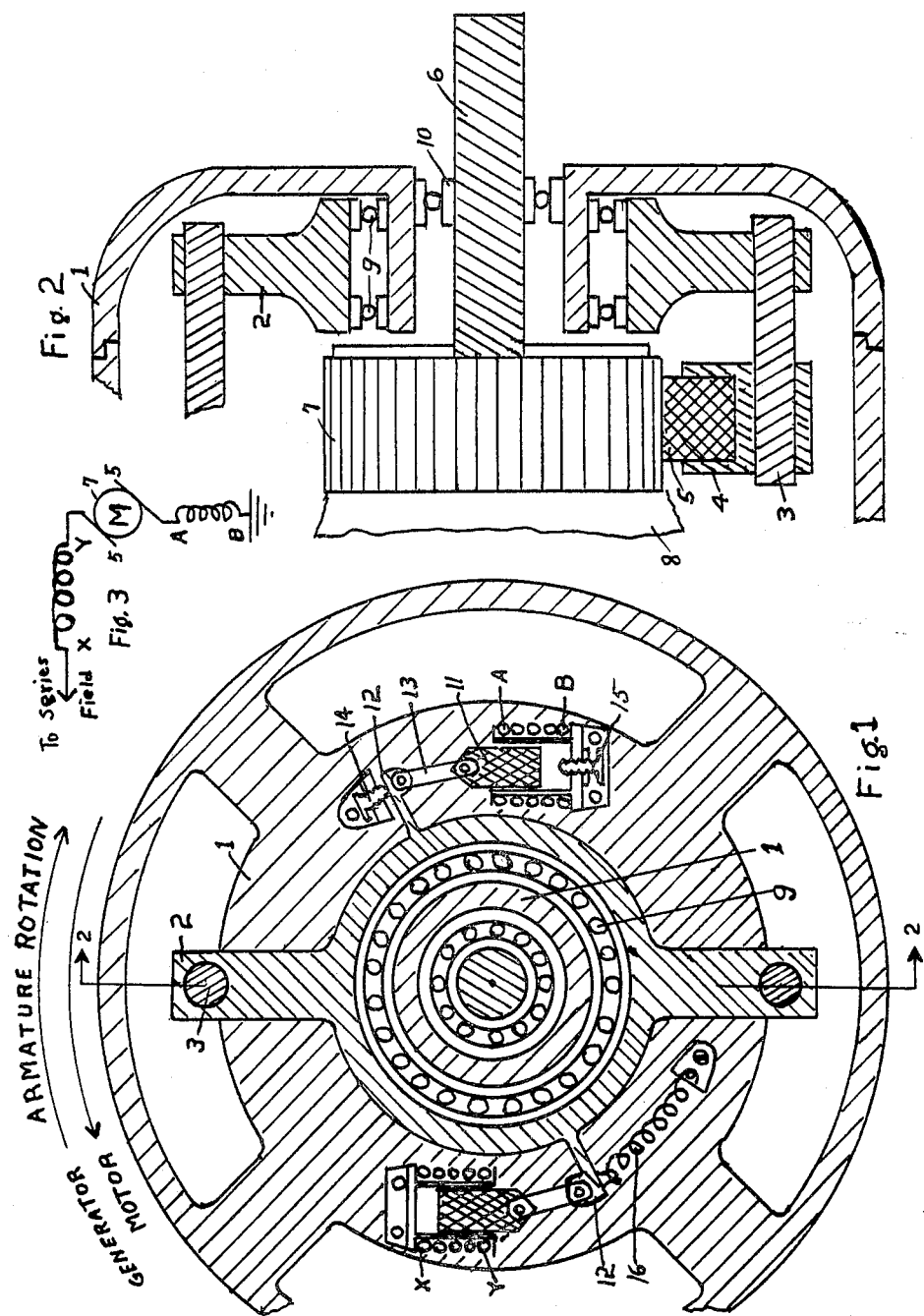

AUTOMATIC BRUSH SHIFTING FOR A D.C. SERIES MOTOR

CROSS-REFERENCE TO PRIOR ART DISCLOSURES

There are no prior art anticipating disclosures but of interest is my U.S. Pat. No. 4,130,172 showing a stator or field structure rotating at high speed.

BRIEF SUMMARY OF THE INVENTION

The invention relates to electromagnetic or solenoid means to accomplish rotational brush shifting circumferentially relative to the commutator of a motor in relation to load changes from light to heavy load. More particularly the invention relates to brush shifting means including an electric solenoid carrying machine load current, movable brush holding means mounted on anti-friction bearings, the electric solenoid means being mounted on machine frame means and mechanically connected to brush circumferentially relative of the commutator holder means so as to shift the brushes in conformity to changing load conditions.

BACKGROUND OF THE INVENTION

Heavy current D.C. series motors are generally fitted with commutating interpoles to prevent or reduce sparking at the brushes with load changes such as would occur in driving an electric vehicle.

Interpoles are effective for this purpose but they not only increase the cost but require a larger stator to provide room for them between the main poles thus making the motor larger and heavier than would otherwise be necessary. Reducing the cost and weight is important for all motors but is doubly important for the counter rotating motor described in my U.S. Pat. No. 4,130,172 wherein the stator or field structure rotates at high speed and it is imperative to keep its kinetic energy or flywheel effect down to the barest minimum for satisfactory operation.

SUMMARY OF THE INVENTION

An object and advantages of the invention is to provide means for use in electric motor technology that accomplishes satisfactory commutation that is obtained by shifting the brushes a proper circumferentially and controlled amount in the proper direction relative to the commutator due to motor load changes without commutating interpoles.

Therefore a further object of the invention is to provide an electromagnetic means to accomplish proper brush shifting in relation to load changes as will be seen by examination of the accompanying drawings and specification.

BRIEF DESCRIPTION OF THE DRAWINGS

The above and other objects and advantages of the invention will become apparent upon full consideration of the following detailed description and accompanying drawings in which:

FIG. 1 shows an inside and cross-sectional view of a motor end frame showing operating relation of the parts;

FIG. 2 is a vertical section taken along line 2—2 of FIG. 1 and showing mounting details of the brush holder yoke; and FIG. 3 is a schematic wiring diagram showing solenoids carrying the full armature current of a series motor.

DETAILED DESCRIPTION OF INVENTION

Referring to the drawings there is shown a motor end bell or frame 1, a brush holder yoke 2 supported on anti-friction bearings 9 fixed for rotation relative to the frame 1, a brush support 3 supported by said yoke for rotation with said yoke, a brush holder 4 supported by said brush support, a brush 5 supported by said brush holder relative to a motor, an armature shaft 6, extending axially from said commutator 7 which supports an armature 8 in armature shaft support bearings 10.

Electromagnetic means such as a pair of solenoids A–B and X–Y are spaced approximately 180° relative to each other and supported by frame 1. Each of the solenoids include a solenoid plunger 11 which is secured to and operated a projection 12 from the brush yoke through a link 13 extending from yoke projection 12 to solenoid plunger 11, a brush neutral plane adjustment stop 14, and a maximum advance adjustment stop 15 are secured to the frame 1 by any suitable means which limits the rotational movement of the brushes circumferentially relative to the commutator. A tension spring 16 is connected at one end to a spring holder secured to the frame 1 and the opposite end to projection 12 which supports lever 13 connected to the solenoid plunger for solenoid X–Y in order to hold brushes 5 in neutral plane with light load.

Solenoids A–B and X–Y are wound with a few turns of heavy conductor to carry the full load current and are mounted on frame 1.

In operation, with armature rotation as shown, it can be seen that solenoids A–B and X–Y will move brush yoke 2 in proper direction and an amount proportional to armature load current thus minimizing brush sparking with varying load currents without the use of commutating interpoles.

While a simple embodiment is here shown to illustrate the invention, it is obvious that other types of electromagnets, other tension spring arrangements and a system of levers can replace link 13 in accordance with the design of the motor or generator in question.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed and desired to be secured by Letters Patent of the United States is:

1. In a motor or generator, a frame, an armature including a commutator supported in said frame, antifriction bearings supported by said frame, a yoke means supported by said antifriction bearings for a circumferential rotational movement relative to said commutator, a plurality of brushes supported by said yoke means in operative contact with said commutator and rotatable with said yoke relative to said commutator, electromagnetic means including at least one solenoid means supported by said frame and mechanically connected to said yoke means for moving said yoke means and said brushes supported thereby circumferentially relative to said commutator, said solenoid being responsive to load current to automatically shift said brushes in conformity to changing load conditions from light to full load.

2. The motor or generator according to claim 1 wherein the electromagnetic means including two solenoids which are connected in series with the armature so as to carry the load current.

3. The motor or generator according to claim 1 wherein the circumferentially rotatable yoke means for the brushes is restricted between adjustable stops from brush neutral plane up to the desired maximum advance.

4. The motor or generator according to claim 1 wherein said yoke and said brushes are maintained in the brush neutral position at light load by a suitable tension device.

* * * * *